INVENTORS:
GEORGE D. HARDING,
HOWARD L. STORM,
BY C. W. Baker
THEIR ATTORNEY.

CHARGING AND TRIGGERING CIRCUITS FOR PULSED ELECTRICAL DEVICES SUCH AS FLASH LAMPS

Filed Nov. 2, 1966 3 Sheets-Sheet 2

INVENTORS:
GEORGE D. HARDING,
HOWARD L. STORM,

BY C. W. Baker

THEIR ATTORNEY.

INVENTORS
GEORGE D. HARDING,
HOWARD L. STORM,

BY C. W. Baker
THEIR ATTORNEY.

3,475,651

CHARGING AND TRIGGERING CIRCUITS FOR PULSED ELECTRICAL DEVICES SUCH AS FLASH LAMPS

George D. Harding and Howard L. Storm, Syracuse, N.Y., assignors to General Electric Company, a corporation of New York Filed Nov. 2, 1966, Ser. No. 591,471
Int. Cl. H05b *41/14*
U.S. Cl. 315—242 12 Claims

ABSTRACT OF THE DISCLOSURE

Disclosed are charging and triggering circuits for pulsed electrical devices such as flash lamps. The charging circuits described characteristically include a constant current source providing charge current through unidirectional flow means to a pulse forming network, charging current flow being controlled by a crowbar circuit which is selectively operable to short circuit the output of the constant current source when the pulse forming network reaches a predetermined level of charge, and operative also to maintain such short for a controlled time after discharge of the pulse forming network if load characteristics necessitate such delay before beginning the next charging cycle. The triggering circuits described provide electrical isolation from the main discharge line using only relatively simple arrangements of diodes or diodes plus other coupling elements.

The pulse charging and triggering circuits of this invention offer advantages over prior such circuits particularly as to better efficiency of operation and precision of control, and also as to circuit simplicity and cost. They accordingly find utility as general purpose charging and triggering circuits for flash lamp and other pulse systems such as sonar modulators and the like.

The good precision of charge level and charge timing control afforded by the present invention is of particular advantage when used with high energy flash lamps of the type commonly employed in laser pump applications. Such lamps normally require a de-ionization time after firing which may be of the order of milliseconds, and during this time the charge voltage must be held very close to zero before the charge voltage is permitted to again rise in preparation for the next firing. Charge current control satisfying these requirements is readily accomplished in systems in accordance with the present invention, and at the same time these systems enable use of a simplified triggering circuit constituting another aspect of the invention. This circuit provides effective triggering of the load with substantial simplification of circuitry and still affords good isolation between the triggering and main discharge circuits.

It is accordingly a primary object of the invention to provide charging and triggering circuits for pulsed electrical devices, characterized by good precision of control of charge voltage level and of timing of charge and discharge, and by relative simplicity of circuitry and good reliability of operation. It is also an object of the invention to provide controlled charging circuits for flash lamps and the like characterized by the capability to maintain a controlled state of zero or limited low level of charge for a predetermined delay period in each cycle of operation to enable lamp de-ionization.

It is also an object of the invention to provide charging and triggering systems for pulsed electrical devices having high energy supply requirements, including high voltage and high current, and requiring precision of timing of charge and discharge of the circuit. A further object of the invention is the provision of such circuits wherein the charging circuit omits filter capacitors and other large capacitor banks and thus avoids the risk of damage to the load and its triggering circuit which such capacitor banks normally involve.

Briefly stated, in one presently preferred embodiment of the invention, the charging and triggering circuits for a high energy flash lamp or similarly pulsed electrical device comprise a constant current source which is itself of conventional design and may take any of several different forms such as a monocyclic constant current network or one of the transistorized sine wave inverter circuits having constant current output. This current source connects to a rectifier, pulse forming network and load through a crowbar circuit comprising two or more solid state switching devices such as silicon controlled rectifiers selectively operable to short circuit the output of the constant current source except when charging of the pulse forming network is desired, this being possible without penalty to system efficiency because under these conditions power dissipation in the constant current source and crowbar circuit is low. By thus switching the controlled rectifiers, it becomes possible to drop the charging voltage substantially to zero and to hold it at that low level so long as control signal voltage still is applied to the rectifier control anodes. For this purpose, control signals are derived and applied to the rectifier control anodes in response to the level of charge of the pulse forming network to trigger the controlled rectifiers on, and time delay means then are provided for delaying the resumption of charge current flow for some predetermined period of time adequate to allow de-ionization of the flash lamp. With this charging arrangement, it is feasible to utilize a simplified triggering circuit in accordance with the invention, in which the triggering signal generator and trigger pulsing circuit are isolated from the main discharge line by simple diode or diode and capacitor elements.

This invention will be further understood and its various objects, features and advantages more fully appreciated by reference to the appended claims and the following detailed description when read in conjunction with the accompanying drawings, wherein:

Figure 1:
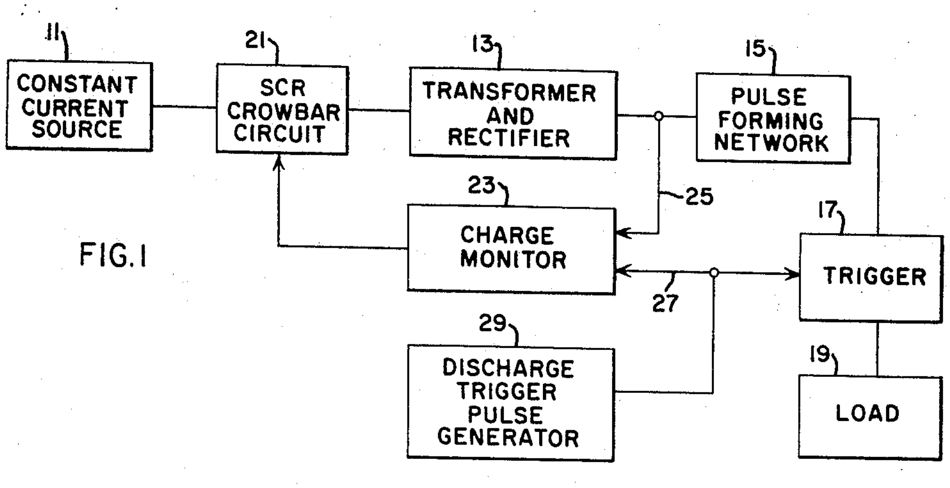
FIGURE 1 is a block diagram of a pulse charging and triggering system in accordance with the invention.

With continued reference to the drawings, wherein like reference numerals have been used throughout to designate like elements, the invention is illustrated in block diagram form in FIGURE 1. As there shown, a constant current source 11 provides an AC charging current output through a transformer and rectifier 13, to thus provide a DC charging current to a pulse forming network 15 which may be of conventional configuration and which is connected through a triggering device 17 to the load 19. This load may be a flash lamp of the high energy type used for laser pulsing, or other pulsed electrical device having similar power supply and control requirements. The constant current source 11 comprises one of a number of known circuits capable of producing an output current which is independent of load impedance and variations in impedance anywhere between some rated maximum value of impedance downwardly to the short circuited or zero value. Several such constant current sources are widely known and used, among them being the now venerable monocyclic constant-voltage-to-constant-current networks and the more recently introduced transistorized sine wave inverters. These circuits have the characteristic that even with a dead short placed across their output the current remains constant at the design current value, or at least does not depart substantially from this value, and power consumption is correspondingly low so that circuit efficiency is not compromised.

Constant current source 11 connects to the load 19 through a crowbar circuit 21 which is operative under control of a charge monitoring circuit 23 to short circuit the output of the constant current source except during those periods of each cycle during which charge current supply to the pulse forming network 15 is desired. As indicated, and as more fully explained hereinafter, this crowbar circuit utilizes silicon control rectifiers for short circuiting the constant current source, with the SCR's being in turn controlled by the charge monitor 23 in response to its two inputs on leads 25 and 27. One such input, by way of connection 25, provides a measure of the level of charge of the pulse forming network 15 and enables precise control of this level of charge by triggering the SCR's to short-circuit the constant current source when the desired charge level is reached. The second control input to charge monitor 23, by way of connection 27, is supplied by the discharge trigger pulse generator 29 which provides a pulsed control signal for triggering the discharge of the flash lamp 19 and also provides a hold signal to the charge monitor 23. In response to this signal the charge monitor generates a hold gate operative to maintain the SCR's switched on through the hold gate period, to thus prevent resumption of charging current flow to the pulse forming network until lamp 19 has had time to de-ionize.

Figure 2:
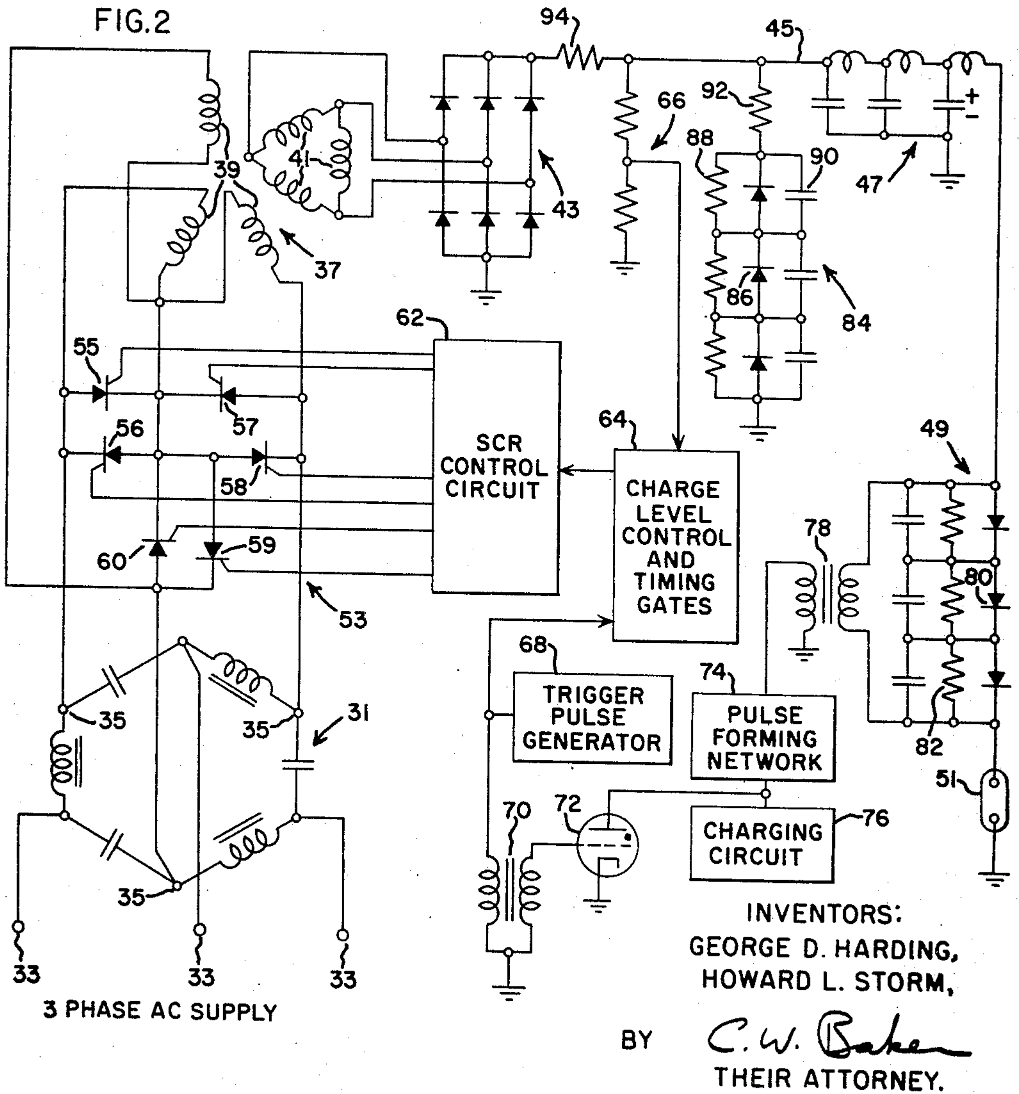
FIGURE 2 is a circuit diagram showing in greater detail the charging and triggering circuits of FIGURE 1.

Operation of the functional blocks just described will best be understood by reference to the more detailed diagram of FIGURE 2, to which reference is now made. The constant current source designated generally by reference numeral 31 in FIGURE 2 takes the form of a monocyclic constant current network, which is one of a family of constant-voltage-to-constant-current transforming circuits having characteristics such that the output current is a function only of input voltage and of the reactance of the components in the network. Steady state output current is, therefore, independent of load characteristics and of changes in load even in the case of a short circuit or zero impedance load. The design of such monocyclic networks is fully explained in the literature, as for example in the book by C. P. Steinmetz entitled "Theory and Calculation of Electrical Circuits" published in 1917.

Detailed description of the circuit accordingly is unnecessary here, and it only need be noted that the network accepts a three-phase AC supply at terminals 33 and transforms this constant voltage supply into a three-phase constant current output across terminals 35. It might also be noted that the output efficiency of conventional monocyclic networks of this type approaches 100% if the nominal losses in their reactive components and transformers are negligible, as is usually the case, and that this efficiency is maintained even when the output is short circuited. When shorted the output voltage drops to extremely low value, as of course is necessary to hold output current constant, so the output volt-ampere product is at or near zero and there is little power consumption elsewhere in the circuit under these conditions.

The constant current output across terminals 35 of network 31 is transmitted to a rectifier transformer 37 having a wye primary 39 and delta secondary 41, and the transformer output is rectified in a full wave rectifier bridge 43. Since the current input to transformer 37 is constant this transformer can be considered a current transformer where a constant primary current is transformed and subsequently rectified, in rectifier bank 43, to a constant DC current. This DC current connects via lead 45 to a pulse forming network (PFN) 47 which may be of conventional configuration, and which connects through a triggering system 49 to be described later, to a flash lamp 51 or similar electrical pulse device constituting the load.

For controlling the supply of charging current to PFN 47, there is interposed between the constant current source 31 and the rectifier transformer 37 a crowbar circuit 53 comprising three oppositely poled pairs of silicon controlled rectifiers 55–60, with each such SCR pair connected to the output leads from constant current source 31 in a manner to short one phase of its three-phase current output, whenever the SCR's are made conducting by application of signal voltage to their control anodes.

The necessary control signals to the SCR's are supplied by a control circuit 62 illustrated in greater detail in FIGURE 3 and described later with reference to that figure. It is sufficient to note here that this circuit is in turn controlled by another circuit 64, labeled "Charge Level Control and Timing Gates" in FIGURE 2, and that in response to a control signal from block 64 the SCR control circuit 62 will generate and supply to each of the silicon controlled rectifiers 55–60 a control signal operative to render all the SCR's conducting, thus short circuiting the output leads of the constant current source 31. The charge level control and timing gates 64 operate in response to a charge level signal derived from a voltage divider 66 which provides a measure of the state of charge of the PFN 47, and also in response to a control input from a trigger pulse generator 68 which initiates the discharge of the flash lamp 51 or other load device.

Trigger pulse generator 68 accomplishes this latter function through a triggering circuit comprising a pulse transformer 70 providing the control input to the grid of a shorting thyratron 72 operative when fired to ground a trigger pulse forming network 74, which is maintained in charged condition by charging circuit 76, thus discharging the network 74 through a second pulse transformer 78 the secondary of which is connected across a diode string 80 or other unidirectional current element in series in the line between the main PFN 47 and flash lamp 51. These diodes 80 serve to provide a low impedance path to the PFN 47 after breakdown of the flash lamp 51, while enabling isolation between the triggering circuit and the flash lamp circuit itself.

The diode stack 80 is a series string of high current silicon diodes capable of holding off the peak inverse trigger voltage. Resistors 82 shunt each diode to insure proper division of inverse voltage across the diodes; these resistors preferably are of value such that the pulse current through them will be 50 to 100 times the normal diode leakage current, to minimize voltage unbalance between the diodes. It should be noted that the diode string need withstand only the trigger pulse voltage and not the combined trigger pulse voltage and charge voltage of the main PFN 47, since the latter voltage is in the forward direction of the diodes.

Flash lamp 51 normally is triggered shortly after PFN 47 has reached the desired charge voltage, such timing being accomplished by proper selection of PFN charge current as determined by the constant current supply and of pulse repetition rate as determined by the discharge trigger pulse generator 68. When the pulse generator 68 triggers thyratron 72 to apply a voltage pulse across the primary of pulse transformer 78, the transformer secondary voltage then adds to that on the main PFN 47 to produce across the flash lamp 51 a total voltage at least adequate to ionize the lamp and fire it. Under these conditions the trigger circuit is essentially shorted across the load impedance of the lamp and the main PFN 47. The pulse forming network 47 then discharges into the flash lamp through the diode string 80, which serves as a low impedance bypass across the trigger transformer 78. After the network has discharged it then is recharged and the sequence repeated, but to enable de-ionization of the flash lamp it is necessary to provide a dead time before resumption of charge current flow to the PFN and repetition of the charging cycle. This necessary dead time is provided by the "Charge Level Control and Timing Gates" 64 later to be described.

During discharge of the pulse forming network 47 through flash lamp 51, there may occur some inverse current as is usual in systems such as this, and an inverse current network 84 is provided to dissipate this current and to bypass most of it away from the bridge rectifiers 43. Inverse current network 84 comprises a silicon diode string 86 with each diode having paralleled with it a resistor 88 and capacitor 90, and includes a series resistor 92 for damping. To further reduce inverse current flow through the bridge rectifiers 43 on discharge of PFN 47, a small resistor 94 may be connected as shown in series with the bridge to assure that the major part of inverse current flow is through the inverse network 84 rather than through the bridge rectifiers.

In operation of the circuit as thus far described, primary power is fed to the monocyclic network 31 which provides its constant current output through the crowbar circuit 53 to the primary of rectifier transformer 37. The output is rectified in bridge 43, and a constant DC current charges the PFN 47 at a predetermined rate (1/prf.). When the preselected charge voltage, which typically may be in the neighborhood of 2,000 volts, is reached, the measure of this voltage provided by voltage divider 66 to the charge level control 64 will cause that control to energize the SCR control circuit 62 and, through it, to render the silicon control rectifiers 55–60 conducting and thus short circuit the output of constant current network 31.

The charging current now drops to zero, and the system is ready for discharge. This action is initiated by trigger pulse generator 68 which fires thyratron 72 to discharge the trigger pulse forming network 74 through pulse transformer 78. This impresses across the flash lamp 51 a trigger pulse voltage which is additive to that provided by the main PFN 47, and produces a combined voltage sufficient to cause ionization of flash lamp 51. PFN 47 then discharges through the flash lamp. To assure that the next charging cycle does not commence until the flash lamp has had time to de-ionize, the discharge trigger pulse signal from generator 68 also is supplied to timing gates 64 and there generates a gate signal operative to hold the SCR's conducting for a predetermined period of time at least adequate to assure de-ionization of the flash lamp before the SCR's are switched off and charging current is again permitted to flow to PFN 47.

Figure 3:
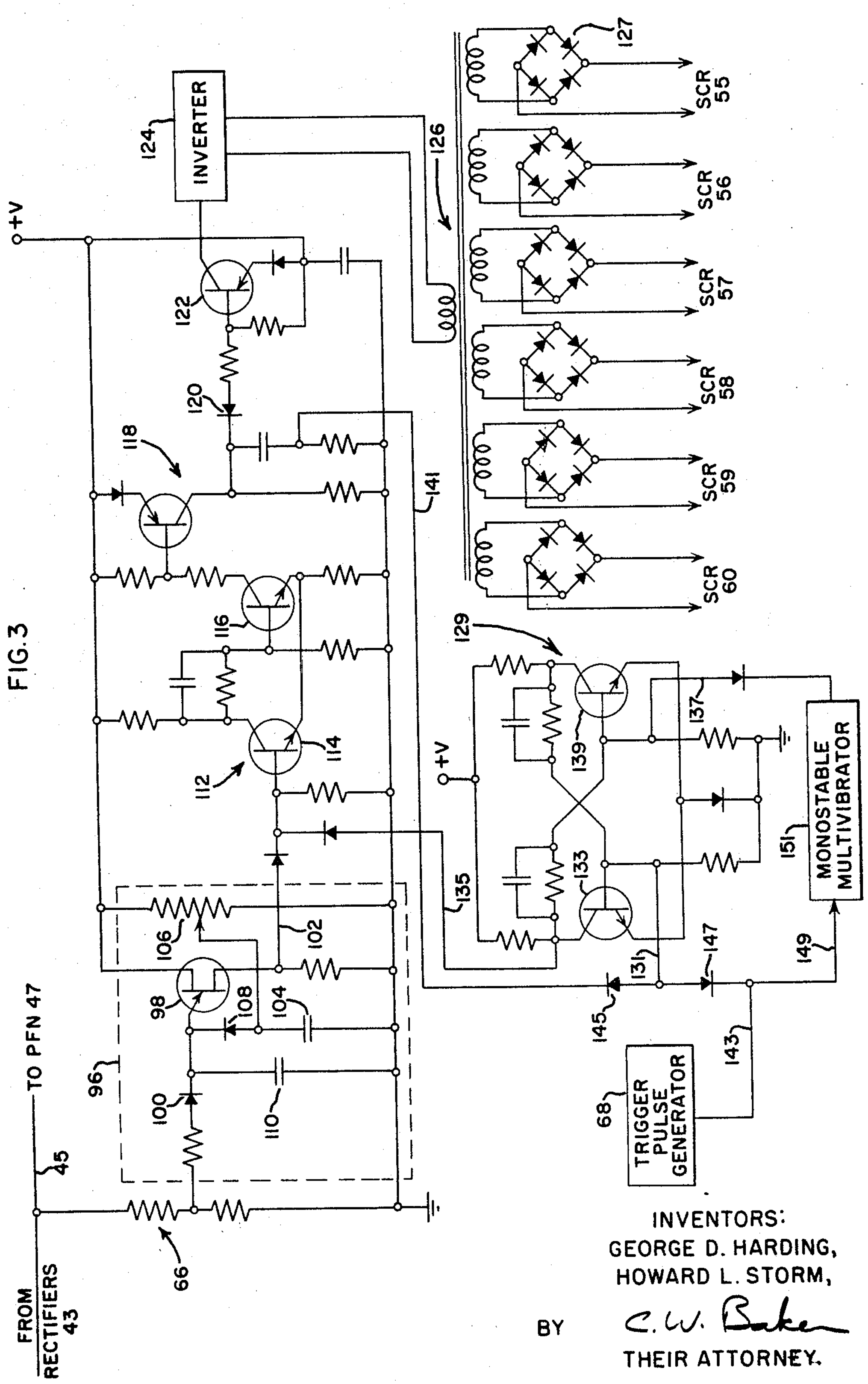
FIGURE 3 is an elementary circuit diagram of the charge level control, timing gates and SCR control in the charging circuit of FIGURE 2.

With reference now to FIGURE 3, the SCR control circuit 62 and the charge level control and timing gate circuit 64 are shown in elementary diagram form. As shown, the charge level signal derived across voltage divider 66 is transmitted to a voltage sensing circuit 96 including a unijunction transistor 98 operative to produce an output pulse train whenever its signal input reaches a predetermined voltage level equal to the peak point voltage of the unijunction emitter, to which the input signal is connected through a diode 100. The unijunction emitter circuit includes a capacitor 104 which is operative to produce an output pulse on discharge through the unijunction and which is recharged rapidly through a resistor 106 after each such pulse. A second diode 108 provides the discharge path for capacitor 104 and a capacitor 110 connected in parallel relation with this diode and the capacitor 104 assists in providing the initial trigger energy for unijunction transistor 98. This voltage sensing circuit itself is conventional in construction and operation, and is essentially similar to the circuit described in the General Electric Transistor Manual, 7th edition, at page 324.

The voltage sensor pulse output is transmitted by lead 102 to a Schmitt trigger circuit which is designated generally by reference numeral 112 and which comprises a pair of transistors 114 and 116 having their electrodes biased to provide a regenerative bistable circuit whose state depends on the amplitude of the input voltage, in conventional Schmitt trigger fashion. Thus, when a pulse occurs on lead 102 the input voltage on the base of transistor 114 rises above the critical and that transistor will begin to conduct and will regeneratively turn off transistor 116; at the trailing edge of this pulse, and assuming no other input to lead 102, the input voltage will drop back down to a level such that transistor 116 will again conduct and transistor 114 will be switched off.

The Schmitt trigger output is coupled through an amplifier stage 118 and through a zener diode 120, which passes only signals of magnitude above some predetermined level set sufficiently high to minimize noise problems, to a switching transistor 122 which provides a DC voltage output whenever a signal is applied to its input. This DC voltage drives an inverter 124 the AC output from which energizes a rectifier transformer 126 having a number of secondary windings corresponding to the number of SCR's in the charging control circuit. These secondaries connect through a like number of rectifier bridges 127 to the SCR's.

It will be appreciated that with the circuit as thus far described, the achievement of full charge on the PFN 47 will cause the unijunction transistor 98 and the voltage sensing circuit of which it forms part to produce a train of discrete pulses on lead 102 to the Schmitt trigger circuit 112. Normally the operation of this trigger circuit with such pulse input would be to flip back and forth between its two stable states upon each passing of a forward edge or trailing edge of one of the pulses transmitted to it on lead 102, so that the final output to the inverter 124 would be a correspondingly pulsed signal rather than the DC output which is desired to drive the inverter. Such pulsing of the SCR drive output is prevented by the hold gate circuit which is designated generally by reference numeral 129 and which as shown comprises a bistable multivibrator or flip-flop. This is a conventional circuit not requiring further description except to note that a pulse appearing on lead 131 to the base of transistor 133 will cause that transistor to stop conducting and produce an output voltage on lead 135; a pulse on lead 137 to the base of the other transistor 139 will turn that transistor off and turn transistor 133 on, thus cutting off the output signal on lead 135 until the next input pulse on lead 131.

As shown, lead 131 connects to two different signal sources, one by way of lead 141 to the output of amplifier stage 118 in the SCR drive circuit and the other by way of lead 143 to the trigger pulse generator 68. Diodes 145 and 147 interposed in these respective leads provide isolation between the different signal sources to which they connect. Lead 143 from the trigger pulse generator 68 connects also by way of a lead 149 to a monostable multivibrator 151 which generates a delay gate in a manner and for a purpose which will be more fully explained hereinafter.

With the circuit elements thus connected, the forward edge of the first pulse generated by the voltage sensing circuit 96 on achievement of the desired PFN charge level as measured by voltage divider 66, will flip the Schmitt trigger on. The resultant output pulse after amplification at 118 will be transmitted by way of leads 141 and 131 to transistor 133 in flip-flop 129, causing that transistor to stop conducting and to produce a positive output signal on lead 135, which constitutes a hold gate signal and continues until application of an input signal to switch off the other transistor 139. This hold gate signal connects back into the SCR drive circuit, at lead 102, where it acts to lock the Schmitt trigger on. Then, so long as flip-flop 129 remains in this state, there will be an input signal voltage continually applied to the base of transistor 114 in the Schmitt trigger circuit even after the trailing edge of the output pulse from the voltage sensor circuit 96 is reached. The Schmitt trigger accordingly remains on, and the "on" signal generated thereby operates to energize the inverter 124 and to hold the SCR's in conducting state.

As previously noted, the discharge trigger signal from pulse generator 68 connects, via lead 149, to a monostable multivibrator 151 providing a delay gate signal by way of lead 137 to transistor 139 in the flip-flop 129. Multivibrator 151 may be of conventional construction and operation and is adjusted to provide an output pulse which is delayed, with respect to the trigger pulse which initiates it, a period at least equal to the maximum de-ionization time for the particular flash lamps to be employed. Commonly used flash lamps normally require de-ionization times of up to perhaps 10 milliseconds, so multivibrator 151 may be adjusted to provide a time delay of at least this magnitude and then to produce an output pulse on lead 137.

This signal, applied to the base of transistor 139 in flip-flop 129, turns that transistor off and transistor 133 on. When transistor 133 thus is switched to its conducting state, it no longer produces an output signal on lead 135 and, since the PFN 47 now is discharged and there accordingly is no pulse output from the voltage sensing circuit 96, the Schmitt trigger will no longer see an input signal and it therefore will revert to its off state. This will cut off power supply to the inverter 124, thus open circuiting the SCR's and enabling the resumption of charge current flow to the PFN 47.

While the time cycles to which the system operates normally are selected to avoid this, there is always a possibility that the system discharge trigger might fire the flash lamp in some instances before the PFN has reached full charge, and if discharge occurred under these conditions there would not yet have been a pulse output from the voltage sensing circuit 96 so the SCR's would still be open circuited. While discharge under these conditions normally would not itself be damaging, recharge would commence immediately upon completion of the discharge and there accordingly would not be the necessary time delay before recharge needed to enable de-ionization of the flash lamp. To avoid this, and to assure that the SCR's are made to short circuit the constant current source output each time a discharge occurs, the trigger pulse generator 68 which initiates flash lamp discharge is connected by lead 143 and diode 147 to the lead 131 to the transistor 133 on flip-flop 129. In this way, the discharge trigger pulse from trigger pulse generator 68 functions in the same way as does the pulse signal input on lead 141, to switch transistor 133 off and to initiate operation of the SCR drive circuit so as to short circuit the constant current source output even though there has not yet occurred a signal output from the voltage sensing circuit 96 indicative that full charge has been reached by the PFN 47.

Figures 4, 5, 6:
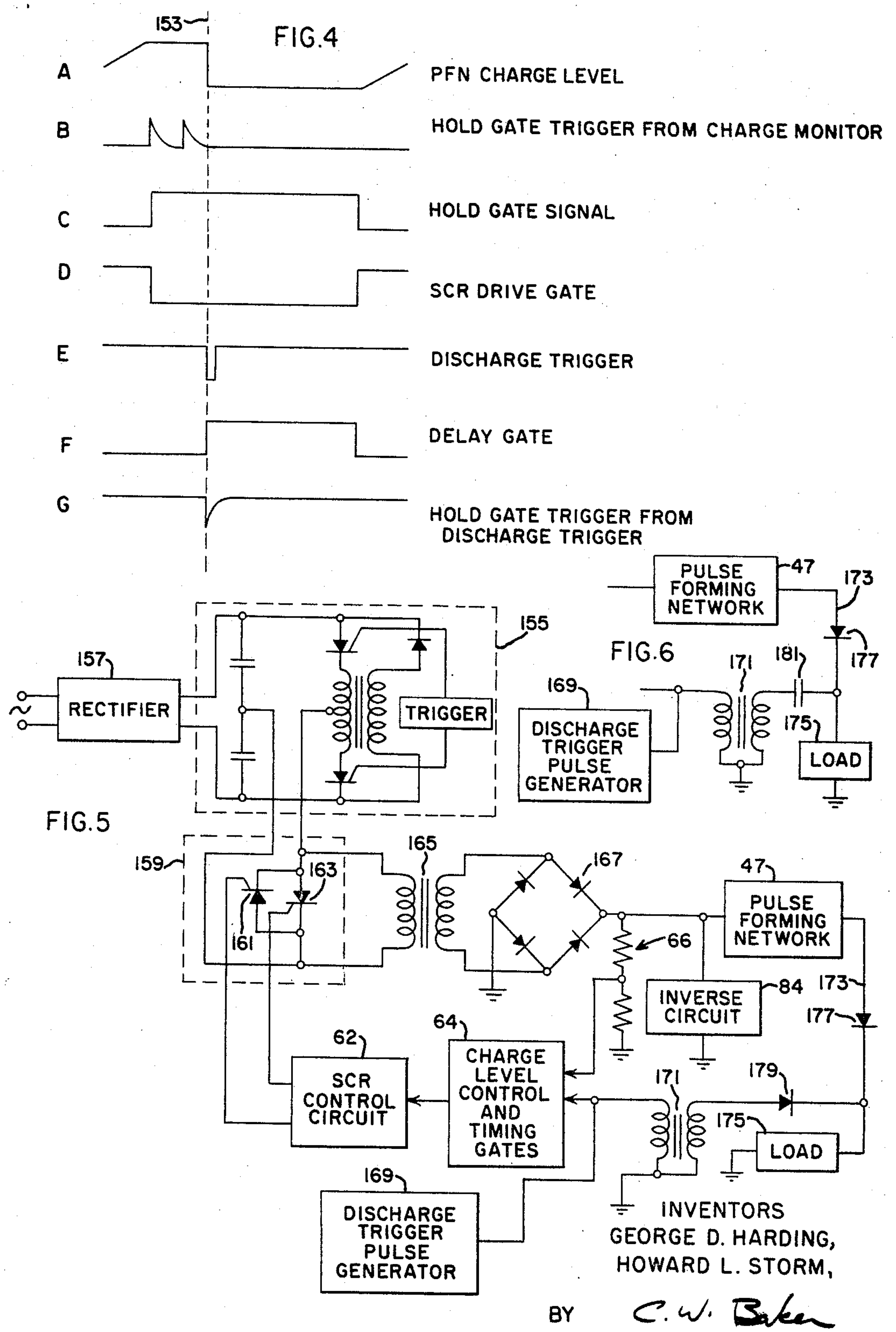
FIGURE 4 illustrates waveforms at various points in the circuit of FIGURE 2.
FIGURE 5 is a circuit diagram of a modified form of the charging and triggering circuits of FIGURE 2.
FIGURE 6 is a partial circuit diagram of a modified form of the pulse discharge triggering circuit of FIGURE 5.

The timing and interaction of the various control signals may perhaps best be understood by reference to the waveforms of FIGURE 4. Waveform A in FIGURE 4 illustrates the charge level input at the PFN 47, and shows the charge level rising with time until full charge level is reached, at which point the SCR's are switched to short circuit the constant current source and thus cut off further supply of PFN charge current. PFN voltage then remains constant until the time of firing of the flash lamp, which time is indicated by the dotted line 153 running vertically in FIGURE 4. At this point the charge level drops to zero and remains at zero level during the lamp de-ionization delay period through which the SCR's continue to maintain the constant current source output short circuited.

Waveform B illustrates the output signal from the voltage sensing circuit 96, and shows this output signal to comprise a series of pulses the forward edge of the first of which causes the Schmitt trigger 112 to transmit a signal via lead 141 to the flip-flop 129. The flip-flop then produces on its output lead 135 a hold gate signal, illustrated as waveform C, having its forward edge corresponding in time to the first of the output pulses from the voltage sensing circuit. The trailing edge of this hold gate signal is controlled by the time delay to which the monostable multivibrator 151 is set, since it is the multivibrator which restores flip-flop 129 to its original state and thus terminates the output signal on lead 135 to the SCR drive circuit. The SCR drive gate, illustrated as waveform D, is coextensive in time with the hold gate signal as illustrated by waveform C, but is inverted with respect thereto.

At some point in time normally not long after full charge is reached by the PFN 47, the trigger pulse generator 68 produces a discharge triggering pulse as shown in waveform E. In addition to its operation as explained above in triggering the discharge of the PFN 47 through the flash lamp or other load, this discharge trigger pulse is transmitted by lead 149 to the monostable multivibrator 151 to commence the delay period fixed thereby, the delay gate thus defined being shown as waveform F in FIGURE 4. Waveform G represents the discharge trigger signal as transmitted by lead 131, switching that transistor off to thus impress on lead 135 a signal causing the SCR's to short circuit the constant current source output, if the SCR's have not already done so in response to a signal from the voltage sensing circuit 96.

With reference next to FIGURE 5, an alternative embodiment of the invention is illustrated which differs from that just described in its use of a constant current source of different type and of different means for isolating the triggering circuit from the main load circuit. As previously explained, it is necessary that the voltage supply to the PFN be brought down to and held at a level sufficiently close to zero that the flash lamp will de-ionize. To accomplish this efficiently the invention as illustrated in FIGURE 2 utilizes a monocyclic constant current network the output of which can be short circuited without detriment to any of the circuit components and with power consumption then dropping reasonably close to the zero level. Other circuits having similar capabilities are known and one such is illustrated in FIGURE 5, wherein there is substituted for the monocyclic constant current network of FIGURE 2 a sine wave inverter circuit 155 having constant current output characteristics. Power supply to the inverter circuit is through a rectifier 157 which converts the AC line supply to DC at voltage level appropriate for operation of the inverter. The inverter output connects through the SCR crowbar circuit designated generally by reference numeral 159, which is similar in circuitry and operation to the SCR crowbar circuit of FIGURE 2 except that since here the output from the constant current source is single phase rather than three-phase, only a single pair of shorting SCR's is required.

The sine wave inverter 155 as shown is of conventional configuration and is described in detail in the General Electric SCR Manual, 3rd Edition, in Sections 9.2.1 and 9.3.2.4. This circuit, like the monocyclic constant current network, has the characteristic that for all load impedances below some rated maximum and down to zero, the output current remains substantially constant independent of load, so that the current output can be short circuited without damage and without excessive power dissipation. The remainder of the circuit incorporates elements which are similar to those in the circuit of FIGURE 2 and which accordingly have corresponding reference numerals applied. The rectifier transformer 165 and rectifier bridge 167 here need accommodate only single-phase current, of course, so these elements are somewhat simplified as shown.

The circuit of FIGURE 5 also differs in its discharge triggering arrangement, in that here the triggering circuit comprising the discharge trigger pulse generator 169 and trigger pulse transformer 171 are isolated from the main discharge line 173 and load 175 not only by a diode connected in the discharge line as at 177, but also by a second diode 179 interposed between the triggering circuit and the line. While both these isolating elements are illustrated as single diodes each will in practice normally comprise a diode string with parallel capacitance and resistance elements as shown at 49 in FIGURE 2 for assuring proper voltage distribution across the diodes. Alternatively, ignitrons may be substituted as the unidirectionally conductive element at 177 and 179 or at both, and may present advantages over solid state devices in some applications.

Another modified arrangement for providing isolation of the discharge triggering circuit from the high energy circuit is illustrated in FIGURE 6, wherein a capacitor 181 is interposed in the lead connecting the trigger circuit to the main discharge line 173 for coupling the trigger pulse to that line. Since this capacitor need withstand only the PFN voltage and not that of the triggering pulse its voltage rating may be kept reasonably low without undue risk of damage due to overvoltage.

While in this description of the invention only certain presently preferred embodiments have been illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. An electrical pulsing circuit cmprising:
- a constant current source operative to supply a substantially constant AC current output to its load at all values of load impedance within an operating range extending down to zero impedance;
- rectifier means for converting the AC current output of said source to DC;
- a charge storage element connected to be charged by the DC current output of said rectifier means;
- a pulsed electrical device connected to said charge storage element for pulse discharge therefrom;
- crowbar circuit means connected across said constant current source and comprising switching means selectively operable to short circuit the output of said constant current source;
- control means operative when said charge storage element reaches a predetermined level of charge to produce a control signal effective to cause said switching means to short circuit the constant current source output and thus cut off charge current flow to the charge storage element;
- and means for triggering discharge of said charge storage element to said pulsed electrical device.

2. An electrical pulsing circuit as defined in claim 1 wherein said constant current source comprises a monocyclic constant-voltage-to-constant-current network.

3. An electrical pulsing circuit as defined in claim 1 wherein said constant current source comprises a sine wave inverter providing constant current output.

4. An electrical pulsing circuit as defined in claim 1 wherein said crowbar circuit means comprises solid state controlled rectifiers switchable between conducting and non-conducting states and connected to short circuit the constant current source output when switched to conducting state.

5. An electrical pulsing circuit as defined in claim 1 wherein said control signal is constituted by a hold gate signal generated in response to achievement by said charge storage element of said predetermined level of charge, and wherein said control means further includes delay gate means operative to prolong said hold gate signal for a predetermined period of duration independent of charge level of said charge storage element, to thus delay open-circuiting of said crowbar circuit and resumption of charge current flow to said charge storage element during the delay period.

6. A pulsing circuit for flash lamps comprising:
- a charging circuit including an AC constant current source operative to supply a substantially constant current output even when shorted;
- rectifier means for converting the AC current output of said source to DC;
- a pulse forming network connected to be charged by the DC current output of said rectifier means;
- crowbar circuit means connected across said constant current source and comprising switching means selectively operable to short circuit the output of said constant current source;
- charge monitoring means comprising means responsive to the level of charge of said pulse forming network to produce a hold gate signal effective to cause said switching means to short circuit the constant current source output and thus cut off the charge current flow to the pulse forming network;
- and a discharge circuit including a conductor connecting said pulse forming network to said flash lamps for discharge therethrough.

7. A flash lamp pulsing circuit as defined in claim 6 wherein said charge monitoring means further comprises means responsive to initiation of said hold gate signal to produce a delay gate signal operative to prolong the hold gate signal for a predetermined period of duration independent of charge level of said pulse forming network.

8. A flash lamp pulsing circuit as defined in claim 7 further including a discharge trigger pulse source and means connecting said pulse source to said flash lamp for firing the lamp, and wherein said charge monitoring means further comprises means responsive to said discharge trigger pulse to generate said hold gate signal, whereby the hold gate signal is initiated by the first to occur of the discharge trigger pulse or the achievement of said predetermined charge level by said pulse forming network.

9. A flash lamp pulsing circuit as defined in claim 6 further including:
- a discharge trigger pulse source operable to produce a discharge trigger pulse at voltage level such that when combined with the charge voltage level of said pulse forming network the resultant exceeds the firing voltage of said flash lamp;
- and means connecting said discharge trigger pulse source to said conductor between said pulse forming network and said flash lamp and including isolating means comprising at least one unidirectionally conductive element interposed in said conductor between the connections thereto of said pulse forming network and said discharge trigger pulse source.

10. A pulsing circuit as defined in claim 9 wherein said isolating means for said discharge trigger pulse source further comprises a pulse transformer having the discharge trigger pulse impressed on its primary and its secondary connected across said unidirectionally conductive element.

11. A pulsing circuit as defined in claim 9 wherein said isolating means for said discharge trigger pulse source further comprises a second unidirectionally conductive element in the connection between said source and said discharge conductor.

12. A pulsing circuit as defined in claim 9 wherein said isolating means for said discharge trigger pulse source further comprises a capacitor element in the connection between said source and said discharge conductor.

References Cited

UNITED STATES PATENTS

| | | | |
|---|---|---|---|
| 2,823,319 | 2/1958 | Vossberg | 307—108 X |
| 2,928,026 | 3/1960 | Hoover | 315—125 |
| 3,248,605 | 4/1966 | Tomkinson | 320—1 X |
| 3,277,342 | 10/1966 | Ross | 317—51 X |
| 3,337,755 | 8/1967 | Grabowski et al. | 320—1 X |
| 3,375,403 | 3/1968 | Flieder | 315—241 X |

JAMES W. LAWRENCE, Primary Examiner

E. R. LA ROCHE, Assistant Examiner

U.S. Cl. X.R.

307—100; 315—246, 276

Dedication 3,475,651.—*George D. Harding* and *Howard L. Storm*, Syracuse, N.Y. CHARGING AND TRIGGERING CIRCUITS FOR PULSED ELECTRICAL DEVICES SUCH AS FLASH LAMPS. Patent dated Oct. 28, 1969. Dedication filed Jan. 12, 1972, by the assignee, *General Electric Company*.

Hereby dedicates to the Public the above-identified Patent.

[*Official Gazette June 27, 1972.*]